United States Patent
Zhang et al.

(10) Patent No.: US 9,287,784 B2
(45) Date of Patent: *Mar. 15, 2016

(54) ADAPTIVE BIASING FOR INTEGRATED CIRCUITS

(75) Inventors: Michael Zhang, Mountain View, CA (US); Yury Gaknoki, San Jose, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/243,813

(22) Filed: Sep. 23, 2011

(65) Prior Publication Data

US 2013/0077357 A1 Mar. 28, 2013

(51) Int. Cl.
*H02M 3/335* (2006.01)

(52) U.S. Cl.
CPC .................. *H02M 3/33507* (2013.01)

(58) Field of Classification Search
CPC ........... G05F 3/205; G05F 3/22; G05F 3/222; G05F 3/225; G05F 3/227; G05F 3/24; G05F 3/242; G05F 3/245; G05F 3/247; G05F 3/26; G05F 3/262; G05F 3/265; G05F 3/267; G05F 1/56; G05F 1/565; H02M 3/33507; H02M 3/335; H02M 3/3353; H02M 3/33538; H02M 3/33546; H02M 3/22; H02M 3/325; H02M 3/33515; H02M 3/33523; H02M 3/33553; H02M 3/33569; H02M 3/337; H02M 3/3376; H02M 3/338; H02M 3/3385; H02M 1/4258; H02M 2001/0006; H02M 2001/0032; Y02B 70/1475
USPC ......... 323/269–276, 351, 280–288, 222–226, 323/311–317, 205–211; 327/309, 545, 327/530–543; 330/267, 268, 270–274, 285, 330/288, 290, 296, 535, 96, 127–142, 330/255–261; 363/21.04–21.18, 16–26, 363/40–43, 89, 95–98, 131–134
See application file for complete search history.

(56) References Cited

U.S. PATENT DOCUMENTS 5,394,112 A 2/1995 Alini et al.
5,745,352 A 4/1998 Sandri et al.
(Continued)

FOREIGN PATENT DOCUMENTS

CN 1405962 A 3/2003
CN 1987710 A 6/2007
(Continued)

OTHER PUBLICATIONS

Office Action received for Korean Patent Application No. 10-2012-105437, mailed on Oct. 7, 2013, 13 pages (8 pages of English Translation and 5 pages of Official Copy).

(Continued)

*Primary Examiner* — Timothy J Dole
*Assistant Examiner* — Carlos Rivera-Perez
(74) *Attorney, Agent, or Firm* — Blakely Sokoloff Taylor & Zafman LLP

(57) ABSTRACT

Methods and apparatuses are disclosed for generating an adjustable bias current. The value of the adjustable bias current may be determined based in part on an error signal representative of a difference between an actual output value and a desired output value of a power converter. When the error signal is below a lower threshold voltage, the adjustable bias current may be set to a first value. When the error signal is above an upper threshold voltage, the adjustable bias current may be set to a second, higher value. When the error signal is between the lower threshold voltage and the upper threshold voltage, the adjustable bias current may change linearly with the error signal.

23 Claims, 6 Drawing Sheets

(56) References Cited

U.S. PATENT DOCUMENTS

| | | | |
|---|---|---|---|
| 6,087,820 A * | 7/2000 | Houghton et al. | 323/315 |
| 6,323,732 B1 * | 11/2001 | Angell et al. | 330/261 |
| 6,545,882 B2 * | 4/2003 | Yang | 363/21.08 |
| 6,871,289 B2 * | 3/2005 | Pullen et al. | 713/300 |
| 7,049,875 B2 * | 5/2006 | Tsividis | 327/308 |
| 7,170,352 B1 | 1/2007 | Caldwell | |
| 7,576,531 B2 * | 8/2009 | Nakabayashi | 323/285 |
| 7,733,074 B2 | 6/2010 | Hasegawa et al. | |
| 2003/0034765 A1 | 2/2003 | Yang | |
| 2004/0189375 A1 * | 9/2004 | Lee et al. | 327/543 |
| 2005/0083129 A1 * | 4/2005 | Tsurumaki et al. | 330/285 |
| 2009/0066304 A1 | 3/2009 | Nakabayashi | |
| 2009/0284994 A1 | 11/2009 | Lin et al. | |
| 2009/0304064 A1 * | 12/2009 | Liu et al. | 375/232 |
| 2011/0074352 A1 | 3/2011 | Huynh et al. | |
| 2012/0013400 A1 * | 1/2012 | Chang et al. | 330/124 R |
| 2013/0077358 A1 | 3/2013 | Gaknoki et al. | |

FOREIGN PATENT DOCUMENTS

| | | | |
|---|---|---|---|
| CN | 101299596 A | | 11/2008 |
| EP | 1909382 A2 | | 4/2008 |
| TW | 583820 B | | 4/2004 |
| TW | 200822510 A | | 5/2008 |
| WO | 99/08372 A1 | | 2/1999 |

OTHER PUBLICATIONS

Office Action received for Chinese Patent Application No. 201210359640.2, issued on Feb. 28, 2014, 28 pages (15 pages of English Translation and 13 pages of Official Copy).

Office Action received for Chinese Patent Application No. 201210359640.2, mailed on Oct. 10, 2014, 30 pages (16 pages of English Translation and 14 pages of Official Copy).

Office Action Received for Korean Patent Application No. 10-2012-105437, mailed on Jun. 19, 2014, 5 pages (2 pages of English Translation and 3 pages of Official Copy).

Non-Final Office Action received for U.S. Appl. No. 13/243,818, mailed on Oct. 6, 2014, 19 pages.

Office Action Received for Taiwan Patent Application No. 101134596, mailed on Sep. 4, 2014, 17 pages (8 pages of English Translation and 9 pages of Official Copy).

Extended European Search Report received for European Patent Application No. 12185147.1, mailed on Mar. 7, 2014, 8 pages.

Final Office Action received for U.S. Appl. No. 13/243,818, mailed on May 1, 2014, 18 pages.

Non Final Office Action received for U.S. Appl. No. 13/243,818, mailed on Aug. 14, 2013, 19 pages.

Final Office Action received for U.S. Appl. No. 13/243,818, mailed on Jul. 15, 2015, 21 pages.

* cited by examiner

ADAPTIVE BIASING FOR INTEGRATED CIRCUITS

CROSS-REFERENCE TO RELATED APPLICATIONS

This application is related to U.S. patent application Ser. No. 13/243,818, entitled "Controller with Constant Current Limit", filed herewith.

BACKGROUND

1. Field

The present disclosure relates generally to power converters, and, more specifically, the present disclosure relates to controllers for power converters.

2. Related Art

Power converters are used in many electrical devices to transform an alternating current (ac) power supply into a direct current (dc) power supply. Generally, these converters include a controller that switches a power switch between an ON state and an OFF state to control the amount of power transmitted to the output of the converter.

In some devices, the controller may be included within an integrated circuit and may use comparators, operational amplifiers, and similar circuits to perform various functions. These analog and digital circuits generally rely on differences in currents, referred to as bias currents, to operate. The magnitudes of the bias currents influence the speed of the circuits. For instance, faster comparators typically require high bias currents, while slower comparators typically require lower bias currents. Similarly, high-bandwidth amplifiers typically require high bias currents, while low-bandwidth amplifiers typically require lower bias currents At high loads, it may be desirable to have fast circuits, while at low loads, slower circuits may be acceptable. Conventional power converters typically supply a steady bias current having a magnitude sufficient to operate the circuits at the speeds required at high loads. While supplying bias currents in this manner allows the circuits to operate at sufficient speeds at both light load and high load conditions, power is wasted at light load conditions where low power consumption is very important.

BRIEF DESCRIPTION OF THE FIGURES

The above and other aspects, features, and advantages of several embodiments of the present invention will be more apparent from the following more particular description thereof, presented in conjunction with the following drawings.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the various embodiments described below, an adjustable bias current generator may generate an adjustable bias current having a current based in part on an error signal representative of a difference between an actual output value and a desired output value of a power converter. The bias current generator may be configured such that when the error signal is below a lower threshold voltage, the adjustable bias current may be set to a first value. The bias current generator may be further configured such that when the error signal is above an upper threshold voltage, the adjustable bias current may be set to a second, higher value. The bias current generator may be further configured such that when the error signal is between the lower threshold voltage and the upper threshold voltage, the adjustable bias current may change proportionally with the error signal.

Figure 1:
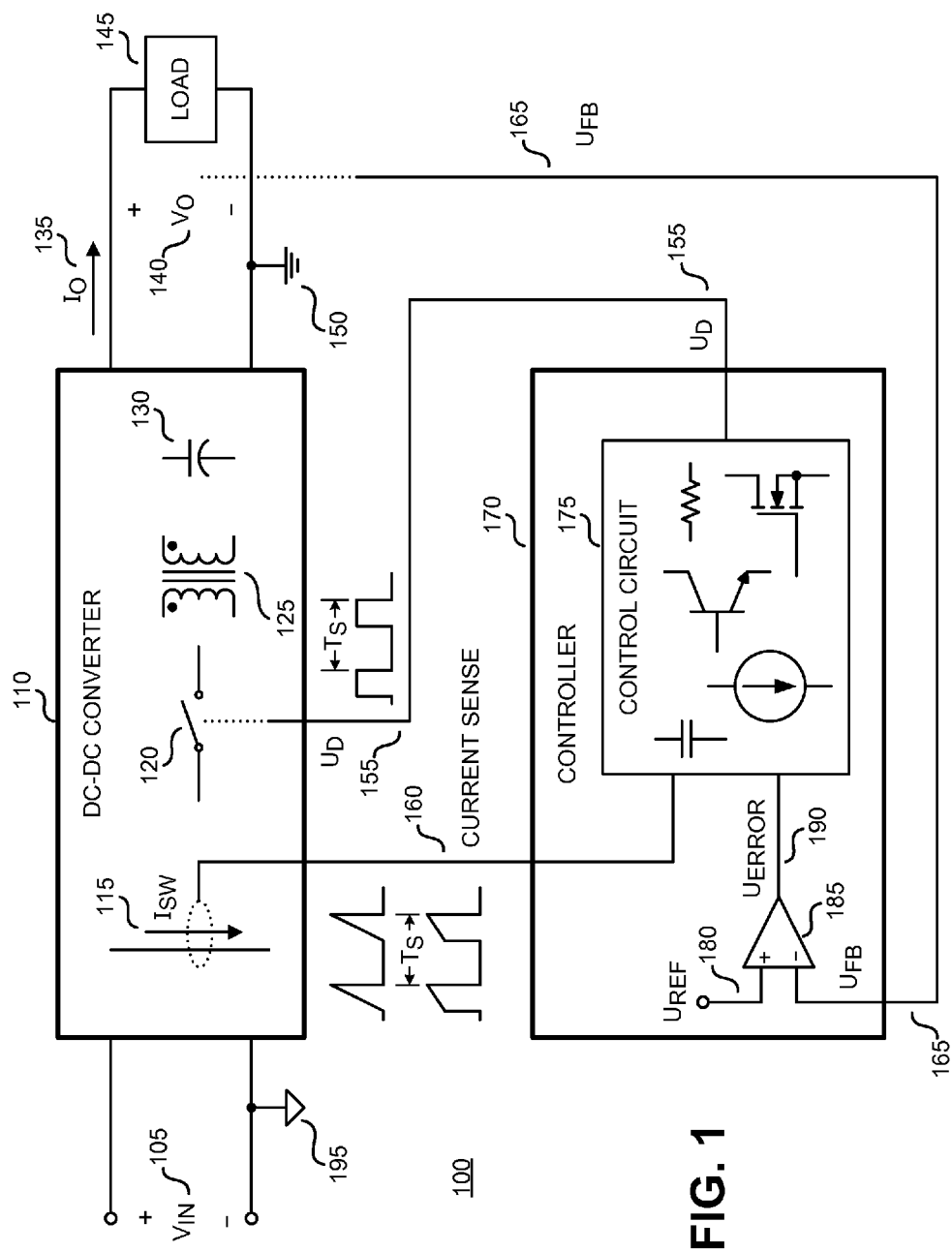
FIG. 1 is a functional block diagram illustrating an example power converter.

FIG. 1 is a functional block diagram illustrating an example power converter 100 that may be controlled using a controller 170 having circuitry to generate an adjustable bias current. Power converter 100 is provided as a general example of a converter that may be controlled using controller 170. While specific examples are described below, it should be appreciated that power converters having other types of power converter topologies, such as, but not limited to, flyback, forward, buck, boost topologies, and the like, may also benefit from the teachings of the present disclosure.

In the illustrated example, power converter 100 includes a dc-dc converter 110 for providing a regulated dc output voltage $V_O$ 140 to a load 145 from an unregulated dc input voltage $V_{IN}$ 105. In the example of FIG. 1, input voltage $V_{IN}$ 105 is positive with respect to an input return 195, and output voltage $V_O$ 140 is positive with respect to an output return 150. In some examples, input return 195 may be coupled to output return 150, while, in other examples, input return 195 may be separate from output return 150. In some examples, dc-dc converter 110 includes a switch 120, such as a metal oxide semiconductor field effect transistor (MOSFET), that switches to control the transfer of energy through energy transfer element 125. Specifically, switch 120 may be used to control the amount of current $I_{SW}$ 115 in the primary winding of energy transfer element 125, and thus, the amount of power transferred to the output winding of energy transfer element 125, by switching between an ON state (allowing the switch to conduct current) and an OFF state (preventing the switch from conducting current). Dc-dc converter 110 further includes an output capacitor 130 for filtering the output voltage $V_O$ 140. Dc-dc converter 110 may further include clamp circuitry (not shown) to limit the maximum voltage across switch 120, feedback circuitry (not shown) to generate a feedback signal $U_{FB}$ 165, or other circuit elements that one skilled in the art would know how to arrange for a particular application.

In some examples, power converter 100 may instead receive an unregulated ac input voltage and may include a bridge rectifier (not shown) for rectifying the ac input voltage to generate the unregulated dc input voltage $V_{IN}$ 105.

Power converter 100 further includes controller 170 for controlling the output voltage $V_{OUT}$ 140, the output current $I_O$ 135, or a combination of both, by selectively scheduling the switching events of switch 120. Specifically, controller 170 may be configured to initiate a switching event by sending a drive signal $U_D$ 155 having a period $T_S$ to the gate or control terminal of switch 120. In response to the drive signal $U_D$ 155, switch 120 may be driven to an ON state or an OFF state. Controller 170 may adjust characteristics of the switching events (e.g., frequency, duration, etc.) to control the amount of power delivered to the output of power converter 100. The characteristics of the switching events may be adjusted in response to various signals, such as current sense 160, which is representative of the switch current $I_{SW}$ 115, and feedback signal $U_{FB}$ 165, which may be representative of the output voltage $V_O$ 140, output current $I_O$ 135, or a combination of the two.

Controller 170 may further include an amplifier 185 for comparing the feedback signal $U_{FB}$ 165 to a reference signal $U_{REF}$ 180, which is representative of a desired output (e.g., output voltage $V_O$ 140), to generate an error signal $U_{ERROR}$ 190, which is representative of the difference between the actual output voltage and the desired output voltage (e.g., output voltage $V_O$ 140). In one example, amplifier 185 includes an integrator that integrates the difference between the reference signal $U_{REF}$ 180 and the feedback signal $U_{FB}$ 165. In other examples, amplifier 185 may include a differentiator as well as an integrator to provide desired characteristics for the stability and the behavior of the power supply in response to changes in input voltage $V_{IN}$ 105 and output current $I_O$ 135 as is well known in the art. Controller 170 may further include control circuit 175 for receiving the current sense 160 signal and for generating the drive signal $U_D$ 155. In some examples, controller 170 may be implemented as an integrated circuit. In other examples, controller 170 and switch 120 may form part of an integrated control circuit that is manufactured as either a hybrid or monolithic integrated circuit.

Figure 2:
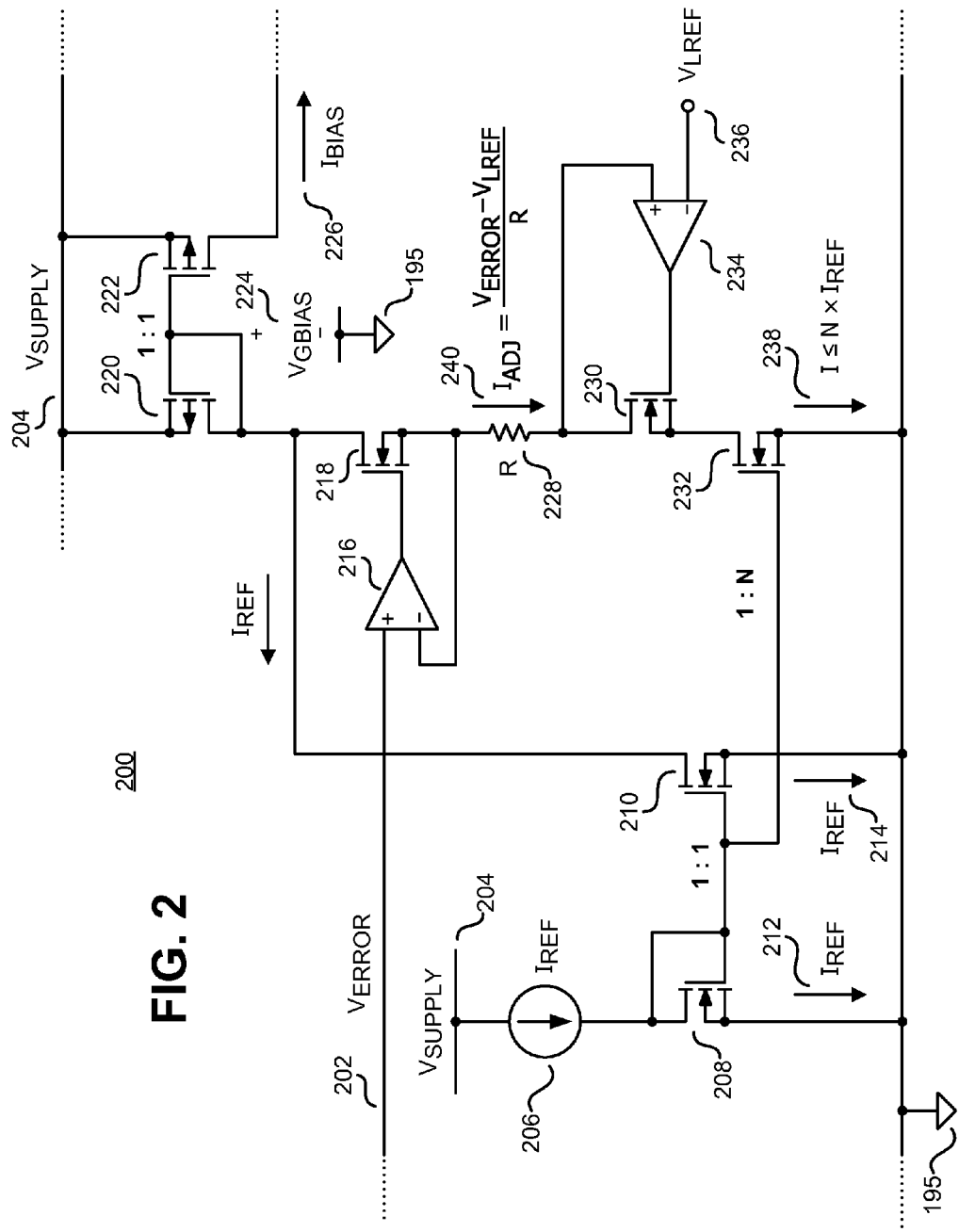
FIG. 2 is a circuit diagram of an example adjustable bias current generator in accordance with an embodiment of the present invention.

FIG. 2 illustrates a circuit diagram of an example adjustable bias current generator 200. Bias current generator 200 is configured to generate an adjustable bias current having a value that changes based on the voltage of an error signal representative of a difference between an actual output and a desired output of a power converter. The error signal may also be representative of a load attached to the power converter. Thus, the adjustable bias current may have a larger value for larger loads, and a smaller value for smaller loads. As a result, less power may be consumed during low load conditions. Adjustable bias current generator 200 may be separate from, partially included within, or completely included within a controller similar or identical to controller 170 shown in FIG. 1.

Adjustable bias current generator 200 includes supply voltage $V_{SUPPLY}$ 204, current source 206, operational amplifiers 216 and 234, transistors 208, 210, 218, 220, 222, 230, and 232, and resistor 228. Operational amplifiers 216 and 234 with respective transistors 218 and 230 are configured as voltage followers, such that the voltage at the inverting input of each amplifier is substantially equal to the voltage at the non-inverting input. In the illustrated example, adjustable bias current generator 200 includes a reference current circuit including current source 206 and transistors 208 and 210 for generating a constant reference current 214. In some examples, current source 206 generates a constant current 212 having a constant value $I_{REF}$ that may be conducted through diode connected transistor 208. The gate of transistor 210 is coupled to the gate of transistor 208, thereby coupling transistor 210 to transistor 208 as a current minor. The ratio of channel width to channel length of transistor 210 may be the same, or at least substantially the same, as the ratio of channel width to channel length of transistor 208. Thus, transistor 210 may conduct a constant reference current 214 equal, or at least substantially equal, to the constant current 212 generated by current source 206. It will be appreciated by those skilled in the art that it is not necessary for transistors 208 and 210 to have dimensions such that reference current 214 is made substantially equal to the constant current 212 generated by current source 206. Transistors 208 and 210 may be chosen such that reference current 214 is either an arbitrary multiple or an arbitrary fraction of the current 212, and the values of other components in bias current generator 200 may be adjusted appropriately to achieve the desired behavior in accordance with the teachings of the present disclosure.

Bias current generator 200 further includes a comparison circuit including transistors 218, 230, and 232, operational amplifiers 216 and 234, and resistor 228. In some examples, the comparison circuit generates an adjustable reference current 240 based on a difference between the error voltage $V_{ERROR}$ 202 (an example of error signal $U_{ERROR}$ 190) and the reference signal $V_{LREF}$ 236. In the illustrated example, the gate of transistor 232 is coupled to the gate of transistor 208, coupling transistor 232 and transistor 208 as a current mirror. However, unlike transistor 210, the ratio of channel width to channel length of transistor 232 may be "N" times that of transistor 208. Thus, transistor 232 may conduct a current 238 equal to ($N \times I_{REF}$).

Transistor 232 is also coupled to resistor 228, transistor 230, and transistor 218 such that a current in transistor 232 is the same as the current in transistor 230, resistor 228, and transistor 218. The gates of transistors 230 and 218 are coupled to the outputs of operational amplifiers 234 and 216, respectively. Operational amplifier 216 receives error voltage $V_{ERROR}$ 202, which may be a voltage representation of error signal $U_{ERROR}$ 190, at its non-inverting input terminal and is coupled to a first end of resistor 228 at its inverting input terminal. Operational amplifier 234 receives reference voltage $V_{LREF}$ 236, which represents a lower threshold for error voltage $V_{ERROR}$ 202, at its inverting input terminal and is coupled to a second end of resistor 228 at its non-inverting input terminal. When coupled in this way as voltage followers, operational amplifiers 216 and 234 force a current 240 having a value $I_{ADJ}$ equal to ($V_{ERROR} - V_{LREF}$)/(R) in transistor 232 when $V_{ERROR}$ 202 is greater than $V_{LREF}$ 236 and less than $V_{LREF} + (N \times I_{REF} \times R)$. However, since the ratio of channel width to channel length of transistor 232 is "N" times that of transistor 208, the maximum value $I_{ADJ}$ of current 240 is equal to (N×$I_{REF}$). Therefore, when $V_{ERROR}$ 202 is greater than $V_{LREF}$+(N×$I_{REF}$×R), operational amplifier 234 and transistor 230 are unable to hold the voltage at non-inverting input of operational amplifier 234 at the value $V_{LREF}$ 236. As a result, the current $I_{ADJ}$ 240 in resistor 228 remains constant for values of $V_{ERROR}$ 202 greater than $V_{LREF}$+(N×$I_{REF}$×R). Additionally, when $V_{ERROR}$ 202 is less than reference voltage $V_{LREF}$ 236, operational amplifier 216 and transistor 218 are unable to conduct current into resistor 228, so transistor 232 conducts substantially no current.

In some examples, N may be equal to 3 or more. However, it should be appreciated that other values may be used depending on the reference current $I_{REF}$ and the desired maximum value of bias current 226. Additionally, the resistance R of resistor 228 may be selected based on the available voltage (e.g., $V_{SUPPLY}$ 204) and the amount of bias current 226 that is desired. In other examples, resistor 228 may include a temperature independent resistor.

Bias current generator 200 further includes an output circuit including transistors 220 and 222. In some examples, the output circuit may output adjustable bias current 226 based at least in part on the constant reference current 214 generated by the reference current circuit and the adjustable reference current 240 generated by the comparison circuit. In the illustrated example, diode connected transistor 220 is coupled to supply voltage $V_{SUPPLY}$ 204, transistor 210, transistor 218, and transistor 222. In this way, the current in transistor 220 is equal to the current in transistor 210 (current 214) plus the current in transistor 218, transistor 230, resistor 228, and transistor 232 (current 240). As mentioned above, the current 214 in transistor 210 has a constant value equal to the constant reference current $I_{REF}$, while the current 240 in transistor 218, transistor 230, resistor 228, and transistor 232 may have an adjustable value $I_{ADJ}$ between zero and (N×$I_{REF}$). Thus, the current in transistor 220 has a range between $I_{REF}$ and ($I_{REF}$+(N×$I_{REF}$)) amperes (A).

In the output circuit, the gate of transistor 222 is coupled to the gate of transistor 220, thereby coupling transistor 222 to transistor 220 as a current mirror. The channel dimensions of transistor 222 may be the same, or at least substantially the same, as the channel dimensions of transistor 220. Thus, transistor 222 may output an adjustable bias current 226 having a value $I_{BIAS}$ that is equal, or at least substantially equal (e.g., within 5% or less), to the current in transistor 220. In the example of FIG. 2, the gates of transistors 220 and 222 have a voltage $V_{GBIAS}$ with respect to the input return 195. It will be appreciated by those skilled in the art that it is not necessary for transistors 220 and 222 to have dimensions such that the adjustable bias current 226 current is substantially equal to the current in transistor 220. Transistors 220 and 222 may be chosen such that bias current 226 is either an arbitrary multiple or an arbitrary fraction of the current in transistor 220 to achieve the desired behavior in accordance with the teachings of the present disclosure.

Figure 3:
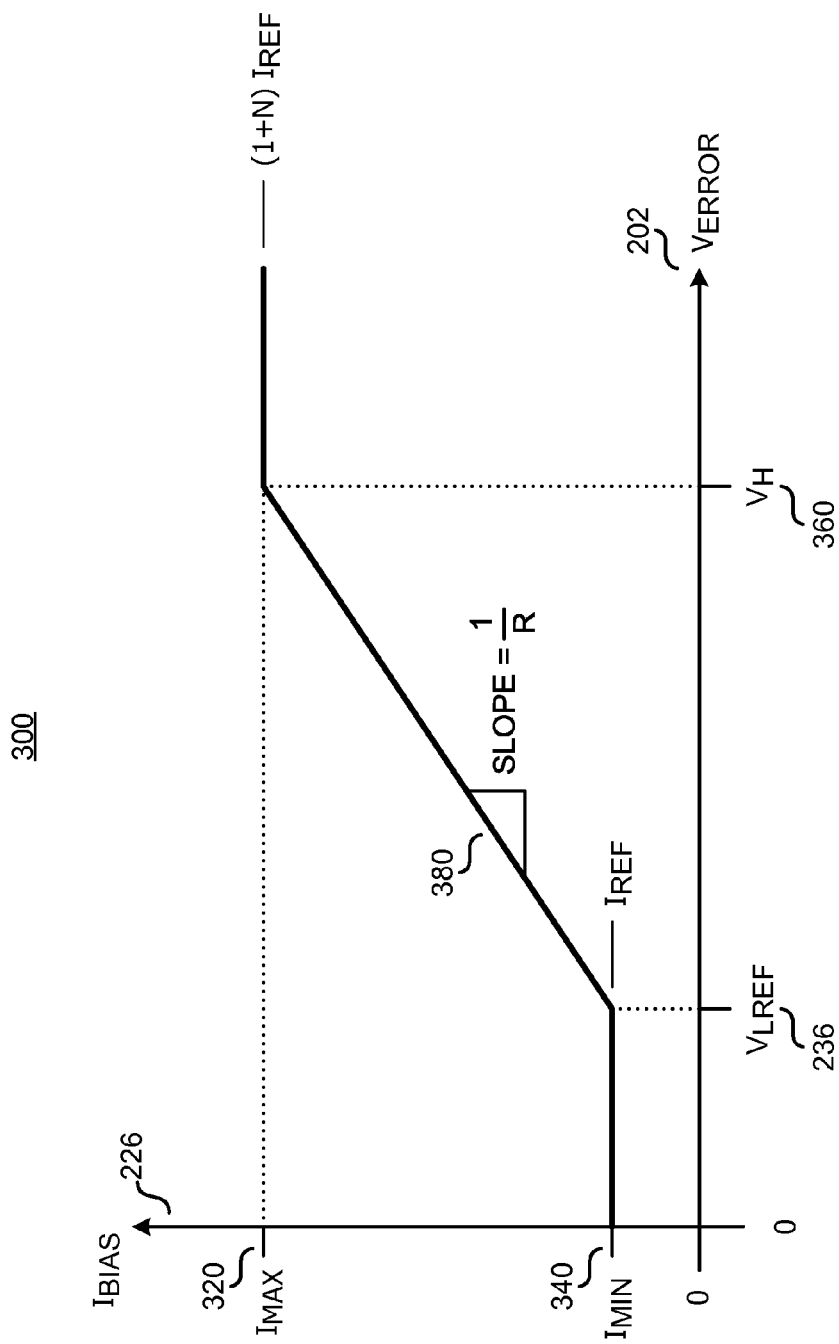
FIG. 3 illustrates the relationship between an error voltage and an adjustable bias current in the example adjustable bias current generator of FIG. 2.

FIG. 3 illustrates an example graph illustrating the relationship between error voltage $V_{ERROR}$ 202 and an adjustable bias current 226. As shown in FIG. 3, the bias current 226 is equal to minimum current limit $I_{MIN}$ 340 when the error voltage $V_{ERROR}$ 202 of error signal $U_{ERROR}$ 190 is equal to or less than reference voltage $V_{LREF}$ 236. Referring back to FIG. 2, when the error voltage $V_{ERROR}$ 202 is equal to or less than reference voltage $V_{LREF}$ 236, the value $I_{ADJ}$ of current 240 is equal, or at least substantially equal, to zero. As a result, the current in transistor 220, and thus, the bias current 226 in transistor 222, is equal to $I_{REF}$ (the constant reference current 214 in transistor 210) when the error voltage $V_{ERROR}$ 202 is equal to or less than reference voltage $V_{LREF}$ 236.

When the error voltage $V_{ERROR}$ 202 is between reference voltage $V_{LREF}$ 236 and upper threshold voltage $V_H$ 360, the adjustable bias current 226 changes proportionally (with a slope 380 of 1/R) with error voltage $V_{ERROR}$ 202. Referring back to FIG. 2, as the error voltage $V_{ERROR}$ 202 increases above reference voltage $V_{LREF}$ 236, transistor 218, transistor 230, resistor 228, and transistor 232 conduct the current 240 having value $I_{ADJ}$. The current 240 having value $I_{ADJ}$ linearly increases since resistor 228 is a constant value. As a result, the current in transistor 220, and thus, the bias current 226 in transistor 222, is equal to $I_{REF}$ (the constant reference current 214 in transistor 210) plus the linearly increasing current 240 having value $I_{ADJ}$ when the error voltage $V_{ERROR}$ 202 is between reference voltage $V_{LREF}$ 236 and upper threshold voltage $V_H$ 360.

As shown in FIG. 3, the bias current 226 is equal to the maximum current limit $I_{MAX}$ 320 ($I_{REF}$+$I_{ADJ}$) when the error voltage $V_{ERROR}$ 202 is equal to or greater than upper threshold voltage $V_H$ 360. Upper threshold $V_H$ 360 corresponds to the value of the error voltage $V_{ERROR}$ 202 that causes the current 240 having value $I_{ADJ}$ to reach its maximum value. Referring back to FIG. 2 and as discussed above, the bias current 226 linearly increases as the error voltage $V_{ERROR}$ 202 increases above reference voltage $V_{LREF}$ 236. However, as the error voltage $V_{ERROR}$ 202 increases to upper threshold voltage $V_H$ 360, the current 240 reaches its maximum value of (N×$T_{REF}$) and remains constant, or at least substantially constant, for values of error voltage $V_{ERROR}$ 202 greater than $V_H$ 360. For values of error voltage $V_{ERROR}$ 202 greater than $V_H$ 360, operational amplifier 234 and transistor 230 cannot control the voltage at the non-inverting input of operational amplifier 234, and the current in resistor 228 is determined only by the mirrored reference current in transistor 232. As a result, the current in transistor 220, and thus, the bias current 226 in transistor 222, is equal to reference current $I_{REF}$ (the constant reference current 214 in transistor 210) plus the maximum value (N×$I_{REF}$) of current 240 when the error voltage $V_{ERROR}$ 202 is greater than upper threshold voltage $V_H$ 360.

As mentioned above, the error voltage $V_{ERROR}$ 202 of error signal $U_{ERROR}$ 190 may change with the load attached to a power converter. As a result, the adjustable bias current 226 of error signal may increase as the load (and the error voltage $V_{ERROR}$ 202 of error signal $U_{ERROR}$ 190) increases, while the adjustable bias current 226 may decrease as the load (and the error voltage $V_{ERROR}$ 202 of error signal $U_{ERROR}$ 190) decreases. In this way, power can be saved by providing a lower bias current when less current is needed.

Figure 4:
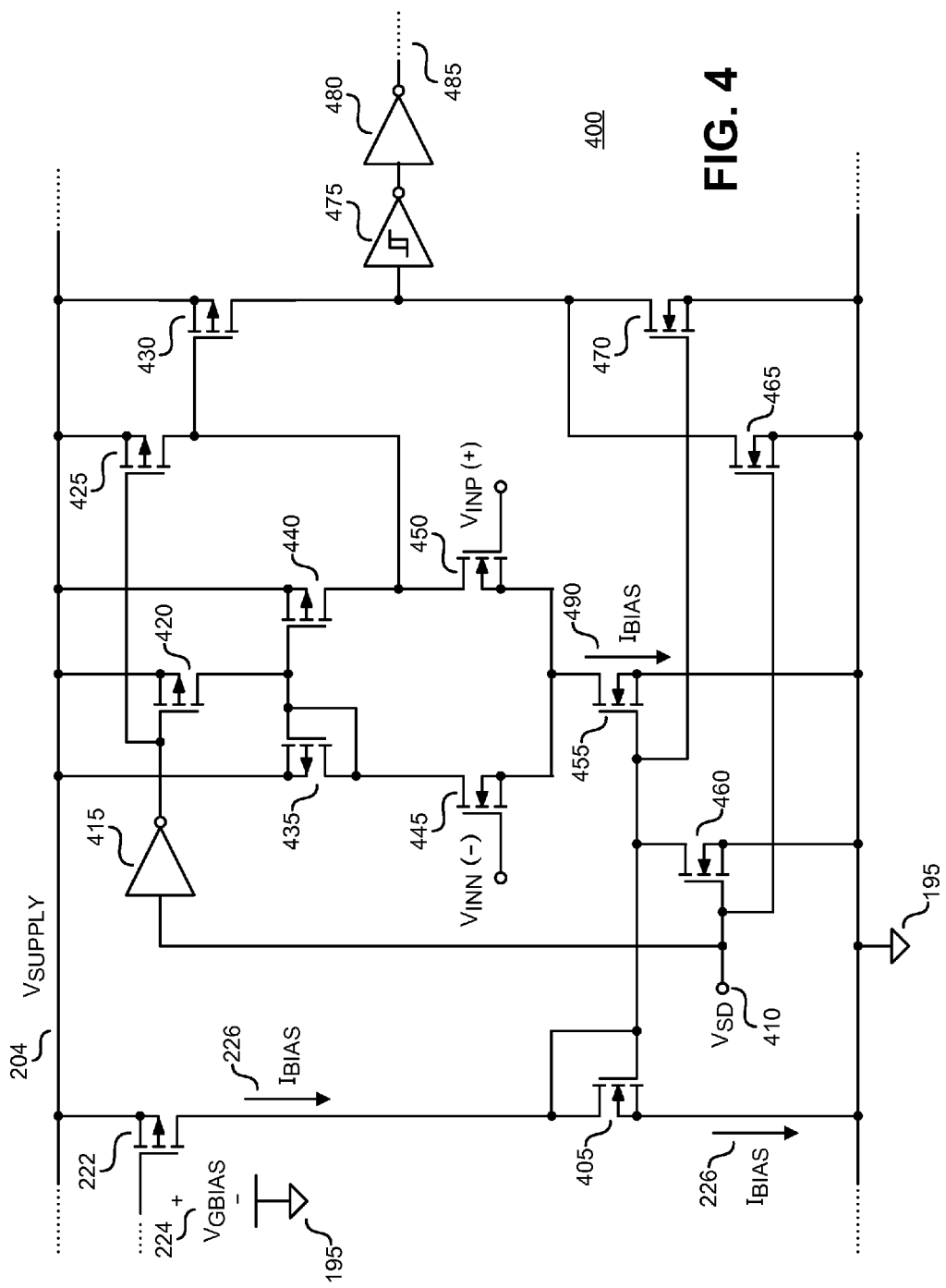
FIG. 4 is a circuit diagram of an example comparator that may receive an adjustable bias current.

As mentioned above, adjustable bias current 226 generated by bias current generator 200 can be used by comparators, operational amplifiers, and similar circuits to perform various functions. For example, FIG. 4 illustrates a circuit diagram for an example comparator 400 that may receive bias current 226 and that may be included with a controller similar or identical to controller 170. Comparator 400 includes transistors 405, 420, 425, 430, 435, 440, 445, 450, 455, 460, 465, and 470. Comparator 400 further includes Schmitt inverter 475 and inverters 415 and 480.

As shown in FIG. 4, comparator 400 receives bias current 226 from transistor 222 of adjustable bias current generator 200 shown in FIG. 2. The bias current 226 in transistor 405 is mirrored in transistors 455 and 470. Comparator 400 receives the inverting input $V_{INN}$ at the gate of transistor 445 and receives the non-inverting input $V_{INP}$ at the gate of transistor 450. Since transistor 455 maintains a constant current 490 having a value of $I_{BIAS}$, the sum of the currents in transistors 445 and 450 is also constant. Thus, the inputs $V_{INN}$ and $V_{INP}$ control the relative amounts of current in transistors 445 and 450, respectively. For instance, when the non-inverting input $V_{INP}$ is greater than the inverting input $V_{INN}$, the current in transistor 450 is greater than the current in transistor 445. As a result, the drain to source voltage of transistor 440 is high, thereby pulling the voltage at the gate of transistor 430 low. This decreases the drain to source voltage of transistor 430, thereby pulling the voltage at the input of Schmitt inverter 475 high. The voltage output of Schmitt inverter 475 is thus a low value. Inverter 480 inverts the low voltage output by Schmitt inverter 475 to a high value.

Conversely, when the non-inverting input $V_{INP}$ is less than the inverting input $V_{INN}$, the current in transistor 450 is less than the current in transistor 445. As a result, the drain to source voltage of transistor 440 is low, thereby pulling the voltage at the gate of transistor 430 high. This increases the drain to source voltage of transistor 430, thereby pulling the voltage at the input of Schmitt inverter 475 low. The voltage output of Schmitt inverter 475 is thus a high value. Inverter 480 inverts the high voltage output by Schmitt inverter 475 to a low value.

In the example shown in FIG. 4, comparator 400 includes optional shutdown circuitry. Specifically, comparator 400 receives shutdown signal $V_{SD}$ 410 at the gate of transistor 460, the gate of transistor 465, and the input of inverter 415. When shutdown signal $V_{SD}$ 410 is not asserted (low value), transistors 460, 465, 420, and 425 are switched to an OFF state, allowing the comparator to operate normally as discussed above. However, when shutdown signal $V_{SD}$ 410 is asserted (high value), transistors 420, 425, 460, and 465 are switched to an ON state, thereby pulling the voltage at the input of Schmitt inverter 475 low. As a result, the output 485 is also pulled low.

While a specific example for comparator 400 is provided above, it should be appreciated by one of ordinary skill in the art that adjustable bias current 226 may similarly be supplied to comparators having other known topologies and configurations, operational amplifiers, and other similar circuits.

Figure 5:
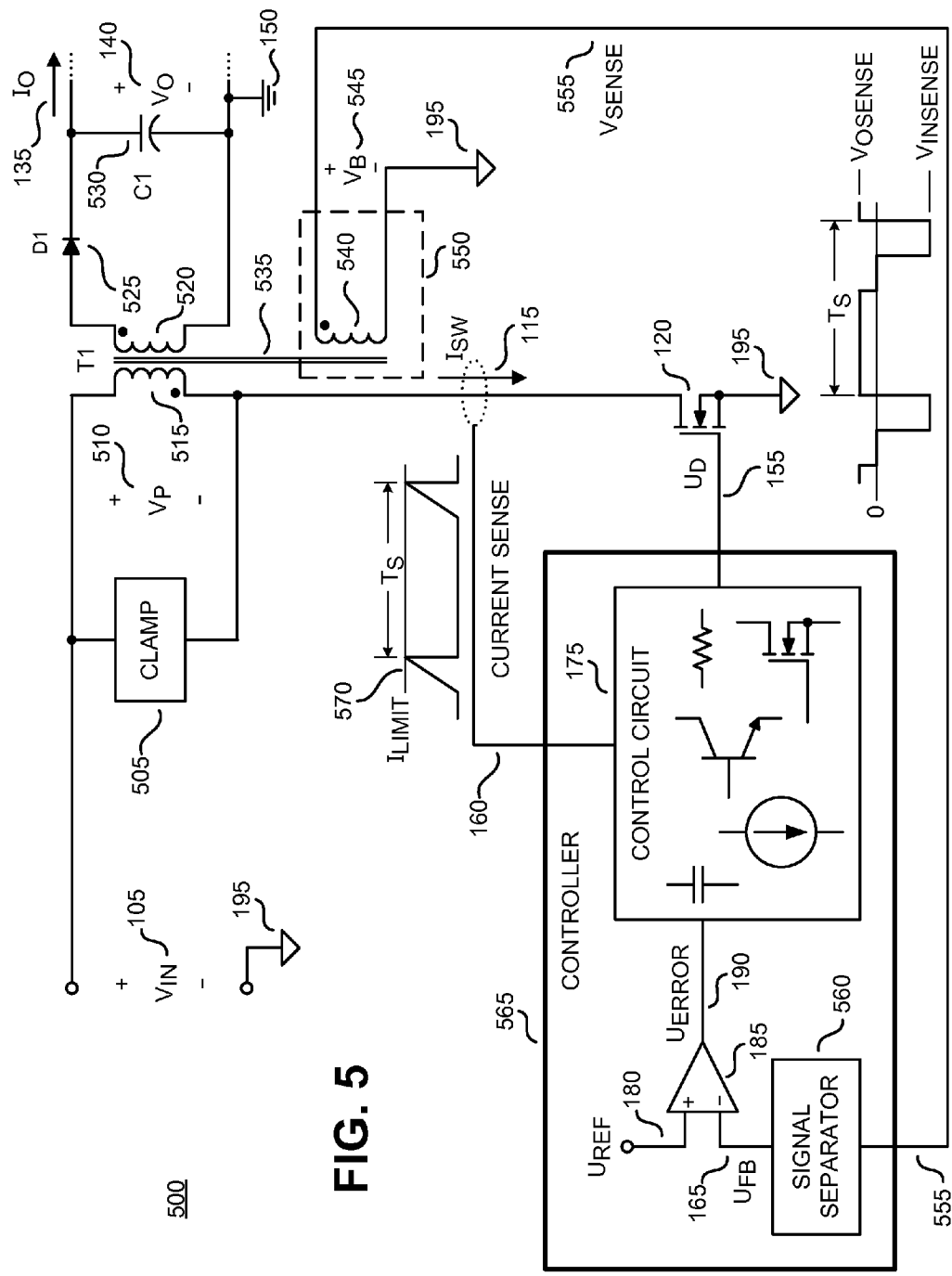
FIG. 5 is a functional block diagram illustrating an example power converter including an adjustable bias current generator in accordance with an embodiment of the present invention.

FIG. 5 illustrates an example flyback converter 500 that can be used with a controller having an adjustable bias current generator similar or identical to that described above. Power converter 500 is configured to receive input voltage $V_{IN}$ 105 and output an output voltage $V_O$ 140 and an output current $I_O$ 135.

Power converter 500 is similar to power converter 100, except that power converter 500 includes a bias winding 540 to sense the output voltage $V_O$ 140. Specifically, power converter 500 includes an energy transfer element T1 that includes a coupled inductor having a primary winding 515, a secondary winding 520, and a bias winding 540. Energy transfer element T1 provides galvanic isolation between the input side and the output side of power converter 500 to prevent dc current between the input side and the output side. An input return 195 is electrically coupled to circuitry typically referred to as being on the "input side" of power converter 500. Similarly, an output return 150, which may be isolated and separate from input return 195, is electrically coupled to circuitry typically referred to as being on the "output side" of power converter 500. Power converter 500 further includes clamp circuitry 505 to limit the maximum voltage across switch 120.

Power converter 500 further includes switch 120 coupled to the primary winding 515 of energy transfer element T1 such that, in operation, energy transfer element T1 receives energy with a current $I_{SW}$ 115 when switch 120 is in an ON state, and energy transfer element T1 delivers energy to the output of power converter 500 after switch 120 is switched to an OFF state. Switch 120 may include a transistor, such as a metal oxide semiconductor field effect transistor (MOSFET), bipolar junction transistor (BJT), or any other transistor, or any other switch that may be turned ON and OFF by a control signal.

Power converter 500 further includes controller 565 configured to control switch 120 using drive signal $U_D$ 155. The drive signal $U_D$ 155 output by controller 565 may be coupled to the gate or control terminal of switch 120 and may cause switch 120 to switch between an ON state and an OFF state to control the amount of switch current $I_{SW}$ 115 in the primary winding 515 of energy transfer element T1, thereby controlling the amount of power transferred to the output winding 525 of energy transfer element T1. Controller 565 may adjust characteristics of the switching events (e.g., frequency, duration, etc.) to control the amount of power delivered to the output of power converter 500. The characteristics of the switching events may be adjusted in response to various signals, such as current sense 160, which is representative of the switch current $I_{SW}$ 115, voltage sense $V_{SENSE}$ 555, which is representative of the output voltage $V_O$ 140 and the input voltage $V_{IN}$ 105. The output of power converter 500 may be rectified by diode D1 525 and filtered by capacitor C1 530 to produce output voltage $V_O$ 140 and output current $I_O$ 135.

As shown in FIG. 5, bias winding 540 of sense circuit 550 is adapted to provide primary feedback by sending voltage sense $V_{SENSE}$ 555 to controller 565, which allows indirect sensing of the input voltage $V_{IN}$ 105 and the output voltage $V_O$ 140 from the input side of the power converter 500. During the ON-time of switch 120, the bias winding 540 produces a voltage $V_B$ 545 that is representative of the input voltage $V_{IN}$ 105. During the OFF-time of switch 120, the voltage $V_B$ 545 of voltage sense $V_{SENSE}$ 555 may be equivalent to, or a scaled version of, output voltage $V_O$ 140. Due to the magnetic coupling in energy transfer element T1, energy is delivered to output winding 525 and to bias winding 540 after switch 120 is switched to an OFF state. The magnetic coupling further causes the voltage induced across bias winding 540 to be substantially proportional to the voltage across secondary winding 520. Since the voltage across output winding 525 is only approximately 0.7 V (a diode forward voltage drop) greater than the output voltage $V_O$ 140 while diode D1 525 is conducting, bias voltage $V_B$ 545 increases to a voltage representative of the output voltage $V_O$ 140 when energy is transferred during the OFF state of switch 120. In other words, controller 565 may use voltage sense $V_{SENSE}$ 555 to regulate a sensed output voltage to a desired voltage that is representative of a desired output voltage. For example, the positive portion of bias voltage $V_B$ 545 may be regulated to approximately 10 V in order to indirectly regulate the output voltage $V_O$ 140 to approximately 5 V.

In some examples, controller 565 includes a signal separator circuit 560 for receiving voltage sense $V_{SENSE}$ 555 and generating feedback signal $U_{FB}$ 165. Controller 565 further includes an amplifier 185 for amplifying a difference between feedback signal $U_{FB}$ 165, which is representative of the output voltage $V_O$ 140, and reference signal $U_{REF}$ 180, which is representative of a desired output voltage, to generate error signal $U_{ERROR}$ 190, which is representative of a difference between the desired output voltage and the actual output voltage. Controller 565 further includes a control circuit 175 for generating drive signal $U_D$ 155 based at least in part on error signal $U_{ERROR}$ 190 and current sense 160.

In some examples, control circuit 175 of controller 565 may include a bias current generator similar or identical to bias current generator 200 of FIG. 2. The bias current generator may use the error signal $U_{ERROR}$ 190 output by amplifier 185 to generate an adjustable bias current as described above with respect to FIGS. 2 and 3. The adjustable bias current may be used to efficiently operate comparators, operational amplifiers, and other similar circuits during low and high load conditions.

In some examples, controller 565 may be implemented as an integrated circuit. In other examples, controller 565 and switch 120 may form part of an integrated control circuit that is manufactured as either a hybrid or monolithic integrated circuit.

While a specific flyback converter is provided above, it should be appreciated that a controller having an adjustable bias current generator may be used in other power converter systems having other types of power converter topologies, such as, but not limited to, forward, buck, boost topologies, and the like.

Figure 6:
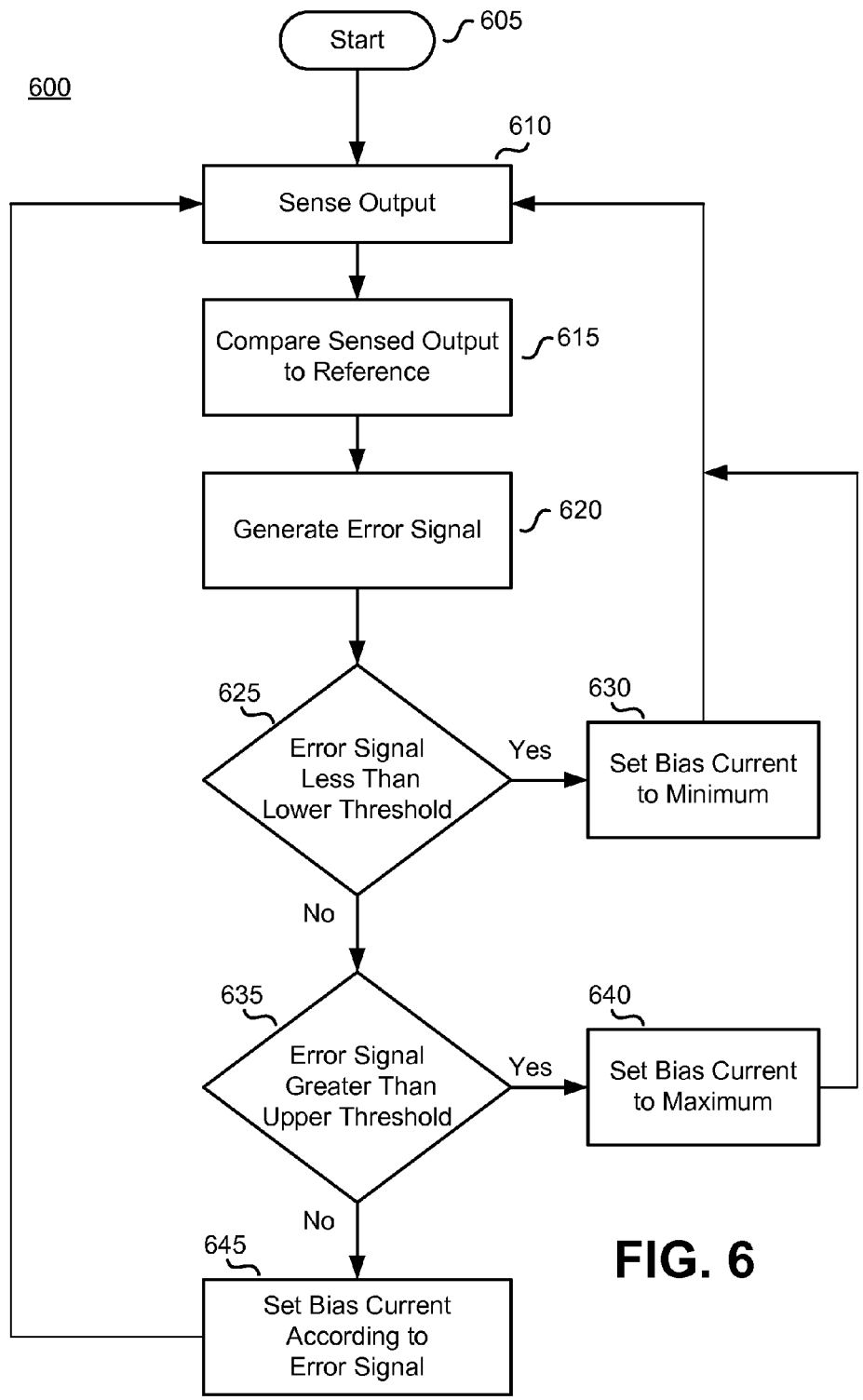
FIG. 6 illustrates an example process for generating an adjustable bias current in accordance with an embodiment of the present invention.

Referring now to FIG. 6, an example process 600 for generating an adjustable bias current is shown. In some examples, the adjustable bias current may be supplied to a comparator, operational amplifier, or other similar circuit. Process 600, begins at block 605 and proceeds to block 610, where an output of a power converter is sensed. For example, a signal representative of the output voltage of a power converter may be sensed using a bias winding similar or identical to bias winding 540. In other examples, other techniques for sensing an output may be used.

At block 615, the sensed output may be compared to a reference. For example, an amplifier similar or identical to amplifier 185 may be used to compare the sensed output (e.g., voltage sense $V_{SENSE}$ 555), which is representative of the output of the power converter, to a reference (e.g., feedback reference signal $U_{REF}$ 180), which is representative of a desired output of the power converter.

At block 620, an error signal may be generated. For example, an amplifier similar or identical to amplifier 185 may be used to generate an error signal (e.g., error signal $U_{ERROR}$ 190) representative of a difference between a desired output value (e.g., reference signal $U_{REF}$ 180) and an actual output value (e.g., voltage sense $V_{SENSE}$ 555).

At block 625, it may be determined whether or not the error signal is less than a lower threshold value. For example, a circuit similar or identical to adjustable bias current generator 200 may be used to compare the error signal (e.g., the voltage $V_{ERROR}$ 202 of error signal $U_{ERROR}$ 190) to a lower threshold value, such as reference voltage $V_{LREF}$ 236. If the error signal is less than the lower threshold, the process may proceed to block 630 where the adjustable bias current may be set to a minimum value, after which, the process may return to block 610. For example, the adjustable bias current may be set to $I_{REF}$ if the error signal is less than the lower threshold. However, if the error signal is not less than the lower threshold, then the process may proceed to block 635.

At block 635, it may be determined whether or not the error signal is greater than an upper threshold value. For example, a circuit similar or identical to adjustable bias current generator 200 may be used to determine if the error signal (e.g., the voltage $V_{ERROR}$ 202 of error signal $U_{ERROR}$ 190) is greater than an upper threshold value, such as upper threshold voltage $V_H$ 360. If the error signal is greater than the upper threshold, the process may proceed to block 640 where the adjustable bias current may be set to a maximum value, after which, the process may return to block 610. For example, the adjustable bias current may be set to $I_{REF}+(N \times T_{REF})$ if the error signal is greater than the upper threshold $V_H$ 360. However, if the error signal is not greater than the upper threshold, then the process may proceed to block 645.

At block 645, the adjustable bias current may be set to a value according to the error signal. For example, using a circuit similar or identical to adjustable bias current generator 200, the adjustable bias current may be set to change proportionally with the error signal (e.g., the voltage $V_{ERROR}$ 202 of error signal $U_{ERROR}$ 190) as shown in FIG. 3. The process may then return to block 610.

While the blocks of process 600 have been presented in a particular sequence, it should be appreciated that they may be performed in any order and that one or more blocks may be performed at the same time.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An adjustable bias current generator circuit for use in a power converter, comprising:
    a reference current circuit coupled to generate a constant reference current, wherein the reference current circuit includes:
        a current source coupled to generate a constant current; and
        a first current mirror coupled to the current source, wherein the first current mirror includes a first transistor coupled to receive the constant current from the current source, and a second transistor coupled to the first transistor to generate the constant reference current;
    a comparison circuit coupled to the reference current circuit to generate an adjustable reference current, wherein the comparison circuit includes:
        a second current mirror including a third transistor coupled to the first and second transistors;
        a fourth transistor coupled to the third transistor;
        an impedance element coupled to the fourth transistor;
        a fifth transistor coupled to the impedance element, wherein the adjustable reference current is conducted through the fifth transistor, the impedance element, the fourth transistor, and the third transistor;
        a first operational amplifier having an output coupled to the fourth transistor, an inverting input coupled to receive a reference signal representative of a lower threshold voltage, and a non-inverting input coupled to a first end of the impedance element; and
        a second operational amplifier having an output coupled to the fifth transistor, an inverting input coupled to a second end of the impedance element, and a non-inverting element coupled to receive an error signal representative of a difference between an actual output value and a desired output value; and an output circuit coupled to the reference current circuit and the comparison circuit to generate the adjustable bias current, wherein the output circuit includes a third current mirror circuit including a sixth transistor coupled to a seventh transistor, wherein the reference current circuit and the comparison circuit are coupled to receive the constant reference current and the adjustable reference current from the sixth transistor, and wherein the seventh transistor is coupled to the sixth transistor to mirror a sum of the constant reference current and the adjustable reference current to generate the adjustable bias current.

2. The adjustable bias current generator circuit of claim 1, wherein the value of the constant reference current is substantially equal to a value of the constant current.

3. The adjustable bias current generator circuit of claim 1, wherein the value of the adjustable reference current is based at least in part on a voltage at the first end of the-impedance element, a voltage at the second end of the impedance element, and a value of the impedance element.

4. The adjustable bias current generator circuit of claim 1, wherein the sixth transistor is coupled to conduct an output reference current, wherein a value of the output reference current is equal to the sum of the constant reference current and the adjustable reference current.

5. The adjustable bias current generator circuit of claim 1, wherein the error signal comprises a voltage, and wherein the reference signal comprises a voltage.

6. The adjustable bias current generator circuit of claim 1, wherein the adjustable bias current generator circuit is coupled to supply the adjustable bias current to a comparator within a controller of the power converter.

7. The adjustable bias current generator circuit of claim 1, wherein the adjustable bias current generator circuit coupled to supply the adjustable bias current to an operational amplifier within a controller of the power converter.

8. The adjustable bias current generator circuit of claim 1, wherein a gate terminal and a drain terminal of the first transistor are coupled to a gate terminal of the second transistor.

9. The adjustable bias current generator circuit of claim 1, wherein a ratio of channel widths to channel lengths of the first and the second transistors are substantially equal.

10. The adjustable bias current generator circuit of claim 1, wherein a gate terminal and a drain terminal of the first transistor are coupled to a gate of the third transistor.

11. The adjustable bias current generator circuit of claim 1, wherein a ratio of channel width to channel length of the third transistor is greater than a ratio of channel width to channel length of the first transistor by at least a factor of N, wherein the factor of N is an integer.

12. The adjustable bias current generator circuit of claim 11, wherein the factor of N is greater than or equal to 3.

13. The adjustable bias current generator circuit of claim 1, wherein the impedance element is a resistor.

14. The adjustable bias current generator circuit of claim 13, wherein the resistor is a temperature dependent resistor.

15. A power converter comprising:
a dc-dc converter coupled to receive an unregulated dc input voltage and output a regulated dc output voltage; and
a controller coupled to the dc-dc converter and coupled to control the transfer of energy through the dc-dc converter, wherein the controller comprises:

an amplifier operable to generate an error signal representative of a difference between an actual output value and a desired output value; and an adjustable bias current generator circuit, including:
a reference current circuit coupled to generate a constant reference current, wherein the reference circuit includes:
a current source coupled to generate a constant current; and
a first current mirror coupled to the current source, wherein the first current mirror includes a first transistor coupled to receive the constant current from the current source, and a second transistor coupled to the first transistor to generate the constant reference current;

a comparison circuit coupled to the reference current circuit to generate an adjustable reference current, wherein the comparison circuit includes:
a second current mirror including a third transistor coupled to the first and second transistors;
a fourth transistor coupled to the third transistor;
an impedance element coupled to the fourth transistor;
a fifth transistor coupled to the impedance element, wherein the adjustable reference current is conducted through the fifth transistor, the impedance element, the fourth transistor, and the third transistor;
a first operational amplifier having an output coupled to the fourth transistor, an inverting input coupled to receive a reference signal representative of a lower threshold voltage, and a non-inverting input coupled to a first end of the impedance element; and
a second operational amplifier having an output coupled to the fifth transistor, an inverting input coupled to a second end of the impedance element, and a non-inverting element coupled to receive an error signal representative of a difference between an actual output value and a desired output value; and an output circuit coupled to the reference current circuit and the comparison circuit to generate the adjustable bias current, wherein the output circuit includes a third current mirror circuit including a sixth transistor coupled to a seventh transistor, wherein the reference current circuit and the comparison circuit are coupled to receive the constant reference current and the adjustable reference current from the sixth transistor, and wherein the seventh transistor is coupled to the sixth transistor to mirror a sum of the constant reference current and the adjustable reference current to generate the adjustable bias current.

16. The power converter of claim 15, wherein the sixth transistor is coupled to conduct an output reference current, wherein a value of the output reference current is equal to the sum of the constant reference current and the adjustable reference current.

17. The power converter of claim 15, wherein a gate terminal and a drain terminal of the first transistor are coupled to a gate terminal of the second transistor.

18. The power converter of claim 15, wherein a ratio of channel widths to channel lengths of the first and the second transistors are substantially equal.

19. The power converter of claim 15, wherein a gate terminal and a drain terminal of the first transistor are coupled to a gate of the third transistor.

20. The power converter of claim 15, wherein a ratio of channel width to channel length of the third transistor is greater than a ratio of channel width to channel length of the first transistor by at least a factor of N, wherein the factor of N is an integer.

21. The power converter of claim 20, wherein the factor of N is greater than or equal to 3.

22. The power converter of claim 15, wherein the impedance element is a resistor.

23. The power converter of claim 22, wherein the resistor is a temperature dependent resistor.

* * * * *